(12) United States Patent
Nasu et al.

(10) Patent No.: US 10,787,167 B2
(45) Date of Patent: Sep. 29, 2020

(54) DRIVE FORCE CONTROL SYSTEM

(71) Applicant: TOYOTA JIDOSHA KABUSHIKI KAISHA, Toyota-shi, Aichi (JP)

(72) Inventors: Takanobu Nasu, Sagamihara (JP); Hiroshi Isono, Susono (JP); Hidekazu Sasaki, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 224 days.

(21) Appl. No.: 15/902,262

(22) Filed: Feb. 22, 2018

(65) Prior Publication Data

US 2018/0237004 A1    Aug. 23, 2018

(30) Foreign Application Priority Data

Feb. 22, 2017  (JP) .................. 2017-030925

(51) Int. Cl.
*B60K 1/00*    (2006.01)
*B60K 1/02*    (2006.01)
(Continued)

(52) U.S. Cl.
CPC .............. *B60W 30/045* (2013.01); *B60K 1/00* (2013.01); *B60K 1/02* (2013.01); *B60K 6/26* (2013.01);
(Continued)

(58) Field of Classification Search
CPC .......... B60K 7/0007; B60K 2007/0038; B60K 2007/0061; B60K 2007/0092; B60K 17/356; B60K 1/02; B60K 1/00; B60K 17/354; B60K 6/26; B60L 15/2009; B60L 2240/423; B60L 2240/22; B60W 2720/406; B60W 2710/083; B60W 2510/083; B60W 2520/14; B60W 2540/18; B60W 2520/28;
(Continued)

(56) References Cited

U.S. PATENT DOCUMENTS

2005/0278104 A1* 12/2005 Masuda ................ B60W 10/06
                                                                701/69
2011/0196579 A1*  8/2011 Tokimasa .............. B60W 10/20
                                                                701/48
(Continued)

FOREIGN PATENT DOCUMENTS

JP    2005-151623 A    6/2005
JP    2009-248660 A    10/2009
JP    2017-118735 A    6/2017

*Primary Examiner* — Behrang Badii
*Assistant Examiner* — Hossam M Abd El Latif
(74) *Attorney, Agent, or Firm* — Oliff PLC

(57) ABSTRACT

A drive force control system configured to achieve a yaw rate required by a driver. A first target yaw rate is calculated based on a steering angle, and a second target yaw rate is calculated based on a steering torque. A first target torque of a right wheel and a second target torque of a left wheel are calculated based on a first difference between the first target yaw rate and an actual yaw rate. the first target torque is corrected based on the second target yaw rate and the actual yaw rate to obtain a third target torque, and the second target torque is corrected based on the second target yaw rate and the actual yaw rate to obtain a fourth target torque. A controller transmit signals to the drive unit to achieve the third target torque and to achieve the fourth target torque.

5 Claims, 12 Drawing Sheets

(51) Int. Cl.
  *B60K 17/354*   (2006.01)
  *B60K 17/356*   (2006.01)
  *B60K 6/26*     (2007.10)
  *B60K 7/00*     (2006.01)
  *B60L 15/20*    (2006.01)
  *B60W 10/08*    (2006.01)
  *B60W 10/16*    (2012.01)
  *B60W 30/045*   (2012.01)

(52) U.S. Cl.
  CPC .......... *B60K 7/0007* (2013.01); *B60K 17/354* (2013.01); *B60K 17/356* (2013.01); *B60L 15/2009* (2013.01); *B60W 10/08* (2013.01); *B60W 10/16* (2013.01); *B60K 2007/0038* (2013.01); *B60K 2007/0061* (2013.01); *B60K 2007/0092* (2013.01); *B60L 2240/12* (2013.01); *B60L 2240/22* (2013.01); *B60L 2240/423* (2013.01); *B60W 2510/083* (2013.01); *B60W 2520/14* (2013.01); *B60W 2520/28* (2013.01); *B60W 2540/18* (2013.01); *B60W 2710/083* (2013.01); *B60W 2720/14* (2013.01); *B60W 2720/406* (2013.01); *Y02T 10/7275* (2013.01)

(58) Field of Classification Search
  CPC .... B60W 30/045; B60W 10/08; B60W 10/16; B60W 2720/14; Y02T 10/7275
  USPC ........................................................... 701/41
  See application file for complete search history.

(56) References Cited

U.S. PATENT DOCUMENTS

| | | |
|---|---|---|
| 2015/0291210 A1* | 10/2015 | Kageyama ............... B62D 5/04 701/41 |
| 2017/0183008 A1 | 6/2017 | Isono et al. |
| 2017/0210414 A1* | 7/2017 | Sato ........................ B62D 6/003 |
| 2018/0015946 A1* | 1/2018 | Kodera .................... B62D 6/10 |
| 2018/0111642 A1* | 4/2018 | Endo .................... B62D 5/0463 |

* cited by examiner

DRIVE FORCE CONTROL SYSTEM

CROSS REFERENCE TO RELATED APPLICATION

The present invention claims the benefit of Japanese Patent Application No. 2017-030925 filed on Feb. 22, 2017 with the Japanese Patent Office, the disclosures of which are incorporated herein by reference in its entirety.

BACKGROUND

Field of the Invention

Embodiments of the present disclosure relate to the art of a drive force control system for vehicles configured to generate a yaw moment in accordance with an operation of a steering wheel.

Discussion of the Related Art

JP-A-2009-248660 describes an electric steering device in which a steering wheel and a steering mechanism for controlling a turning angle of wheels are not mechanically coupled to each other and a motor for applying a reaction torque to the steering wheel is connected to the steering wheel. According to the teachings of JP-A-2009-248660, the reaction torque is calculated based on a steering angle, a vehicle speed, a yaw rate, and a lateral acceleration, and a steering angle of the steering mechanism is calculated based on a steering angle of the steering wheel. In the event of failure of the steering mechanism, a distribution amount to the right and left wheels is controlled in such a manner that an actual yaw rate follows a target yaw rate calculated based on the steering angle of the steering wheel.

JP-A-2005-151623 discloses behavior control device for electric vehicles. According to the teachings of JP-A-2005-151623, a target turning amount, and a basic value of target slip angle between a travelling direction of the vehicle and an orientation of the vehicle are calculated based on a turning angle of a steering wheel. Torques of drive wheels are controlled based on the target turning amount and the basic value of target slip angle.

In the electric steering device taught by JP-A-2009-248660, the steering wheel and the steering mechanism are not mechanically coupled to each other so that the steering wheel can be rotated comparatively easily. On the other hand, in a conventional vehicle in which a steering wheel and a steerable wheel are connected to each other, a power steering motor is arranged to assist an operation of the steering wheel. In the conventional vehicle, the assist torque to turn the wheels may not be generated in the event of failure of the power steering motor. In addition, if the target yaw rate is determined according to the steering angle of the steering wheel as taught by JP-A-2009-248660, the yaw rate intended by the driver may not be achieved when the steering wheel cannot be operated properly due to failure of the power steering motor SUMMARY Aspects of embodiments of the present application have been conceived noting the foregoing technical problems, and it is therefore an object of embodiments of the present disclosure is to provide a drive force control system configured to achieve a yaw rate required by a driver.

According to one aspect of the embodiment, there is provided a drive force control system, comprising: a drive unit that applies torques to a right wheel and a left wheel; a steering device that turns a pair of steered wheels in accordance with an operating amount of a steering wheel; an actuator that is disposed on a transmission mechanism between the steering wheel and the steered wheels, and that generates a torque in accordance with a steering torque applied to the steering wheel; and a controller that controls the torques applied to the right wheel and the left wheel. In order to achieve the above-explained objective, the controller is configured to: calculate a first target yaw rate based on a steering angle of the steering wheel; calculate a second target yaw rate based on the steering torque applied to the steering wheel; calculate a first target torque of the right wheel and a second target torque of the left wheel based on a first difference between the first target yaw rate and an actual yaw rate; calculate a third target torque by correcting the first target torque based on the second target yaw rate and the actual yaw rate, and a fourth target torque by correcting the second target torque based on the second target yaw rate and the actual yaw rate; and transmit signals to the drive unit to achieve the third target torque and to achieve the fourth target torque.

In a non-limiting embodiment, the controller may be further configured to: transmit signals to the drive unit to achieve the third target torque and to achieve the fourth target torque when a second difference between the second target yaw rate and the actual yaw rate is greater than a first predetermined value; and transmit signals to the drive unit to achieve the first target torque and to achieve the second target torque when the second difference is smaller than the first predetermined value.

In a non-limiting embodiment, the controller may be further configured to: calculate a ratio of the actual yaw rate to the second target yaw rate; transmit signals to the drive unit to achieve the third target torque and to achieve the fourth target torque when the calculated ratio is smaller than a second predetermined value; and transmit signals to the drive unit to achieve the first target torque and to achieve the second target torque when the calculated ratio is greater than the second predetermined value.

According to another aspect of the embodiment, there is provided a drive force control system, comprising: a drive unit that applies torques to a right wheel and a left wheel; a steering device that turns a pair of steered wheels in accordance with an operating amount of a steering wheel; an actuator that is disposed on a transmission mechanism between the steering wheel and the steered wheels, and that generates a torque in accordance with a steering torque applied to the steering wheel; and a controller that controls the torques applied to the right wheel and the left wheel. In order to achieve the above-explained objective, the controller is configured to: calculate a first target yaw rate based on a steering angle of the steering wheel; calculate a second target yaw rate based on the steering torque applied to the steering wheel; calculate a first target torque of the right wheel and a second target torque of the left wheel based on a first difference between the first target yaw rate and an actual yaw rate; calculate a third target torque of the right wheel and a fourth target torque of the left wheel based on a second difference between the second target yaw rate and the actual yaw rate; transmit signals to the drive unit to achieve the third target torque and to achieve the fourth target torque when the second difference is greater than a first predetermined value; and transmit signals to the drive unit to achieve the first target torque and to achieve the second target torque when the second difference is smaller than the first predetermined value.

In a non-limiting embodiment, the controller may be further configured to: calculate a ratio of the actual yaw rate to the second target yaw rate; transmit signals to the drive unit to achieve the third target torque and to achieve the fourth target torque when the calculated ratio is smaller than a second predetermined value; and transmit signals to the drive unit to achieve the first target torque and to achieve the second target torque when the calculated ratio is greater than the second predetermined value.

Thus, according to the embodiment of the present disclosure, the first target yaw rate is calculated based on a steering angle of the steering wheel, and the second target yaw rate is calculated based on the steering torque applied to the steering wheel. The target torques of the right wheel and the left wheel may be calculated based on the difference between the first target yaw rate and the actual yaw rate. Alternatively, when the difference between the second target yaw rate and the actual yaw rate is greater than the first predetermined value, the target torques of the right wheel and the left wheel may also be calculated based on the difference between the second target yaw rate and the actual yaw rate. According to the embodiment of the present disclosure, therefore, a desired yaw rate can be achieved by adjusting the torques of the right wheel and the left wheel based on the second target yaw rate, even when the steering wheel cannot be rotated to a desired angle due to failure of the actuator.

BRIEF DESCRIPTION OF THE DRAWINGS

Features, aspects, and advantages of exemplary embodiments of the present disclosure will become better understood with reference to the following description and accompanying drawings, which should not limit the invention in any way.

DETAILED DESCRIPTION OF THE PREFERRED EMBODIMENT(S)

Embodiment of the present disclosure will now be explained with reference to the accompanying drawings.

Figure 1:
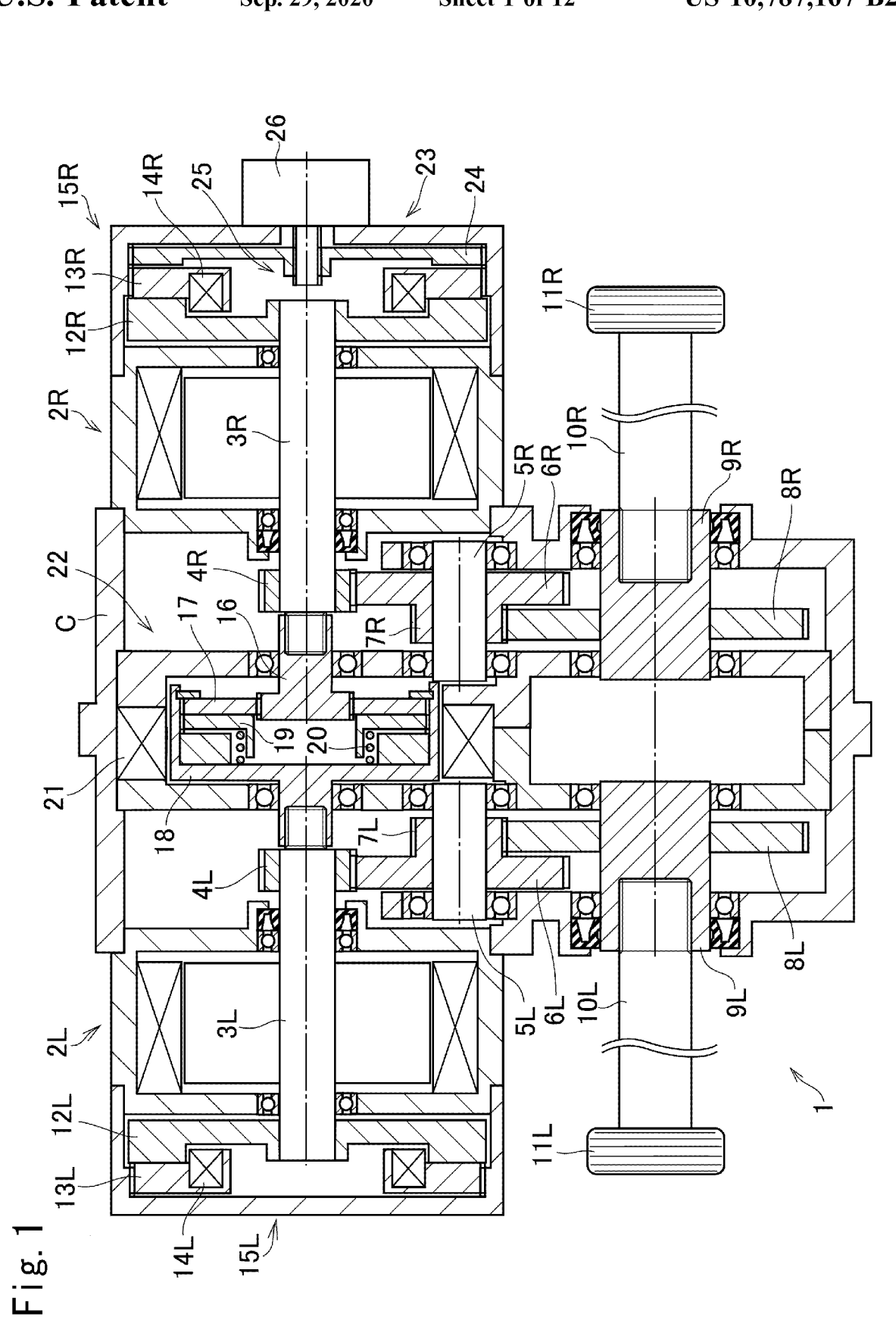
FIG. 1 is a cross-sectional view showing one example of a structure of the drive unit according to the embodiment of the present disclosure.

Turning now to FIG. 1, there is shown one example of a structure of a drive unit to which the drive force control system according to the present disclosure is applied. As can be seen from FIG. 1, a structure of the drive unit 1 is substantially symmetrical across a width center of the vehicle. In the following explanation, only a configuration on the right half in the figure will be explained, and an explanation for the left half will be omitted except for a configuration different from that of the right half. In FIG. 1, accordingly, the reference letter "R" designates members arranged in the right half of the drive unit 1, and the reference letters "L" designates members arranged in the left half of the drive unit 1. In the flowing explanation, the members in the right half of the drive unit 1 will be called the "first member", and the members in the left half of the drive unit 1 will be called the "second member" as necessary.

The drive unit 1 includes a motor 2 serving as a prime mover of a vehicle. For example, a motor-generator such as a permanent magnet synchronous motor may be used as the drive motor, as in the case of conventionally known motors serving as prime movers of hybrid vehicles and electric vehicles.

An output gear 4 is fitted onto a laterally inner end of an output shaft 3 of the motor 2 extending widthwise, and a countershaft 5 extends parallel to the output shaft 3. A counter driven gear 6 that is diametrically larger than the output gear 4 is fitted onto a laterally outer portion of the countershaft 5, and a pinion gear 7 that is diametrically smaller than the counter driven gear 6 is also fitted onto a laterally inner portion of the countershaft 5 to be meshed with a final reduction gear 8 that is diametrically larger than the pinion gear 7.

A cylindrical shaft 9 is inserted into the final reduction gear 8 about the rotational center thereof in such a manner as to protrude laterally outwardly while opening to laterally outside. A laterally inner end of a driveshaft 10 is splined into the opening of the cylindrical shaft 9, and a drive wheel 11 is attached to a laterally outer end of the driveshaft 10.

A disc-shaped brake rotor 12 made of magnetic material is fitted onto a laterally outer end of the output shaft 3. An annular brake stator 13 faces the brake rotor 12. The brake stator 13 is splined into a casing C so that the brake stator 13 is allowed to move toward the brake rotor 12 but not allowed to rotate. The brake stator 13 is provided with a coil 14 so that the brake stator 13 is brought into contact to the brake rotor 12 by an electromagnetic force established by energizing the coil 14.

A brake torque is applied to the brake rotor 12 by frictionally contacting the brake stator 13 to the brake rotor 12. Thus, the brake stator 13, the brake rotor 12, and the coil 14 form a friction brake 15.

An extension shaft 16 is attached to the leading end of the first output shaft 3R closer to the width center of the vehicle than the first output gear 4R. An annular clutch disc 17 is fitted onto the extension shaft 16 to be rotated integrally therewith.

A bottomed-cylindrical cover shaft 18 holding the clutch disc 17 in a hollow space is attached to the leading end of the second output shaft 3L closer to the width center of the vehicle than the second output gear 4L.

An annular pressure plate 19 is interposed between a bottom face of the cover shaft 18 and the clutch disc 17. The pressure plate 19 is made of magnetic material, and is splined into the cover shaft 18 to be rotated integrally with the cover shaft 18 while being allowed to move in the axial direction of the cover shaft 18.

A spring 20 is interposed between the bottom face of the cover shaft 18 and the pressure plate 19 to push the pressure plate 19 toward the clutch disc 17.

A coil 21 is provided on the outer side of the cover shaft 18. The coil 21 generates an electromagnetic force upon being energized, so that the pressure plate 19 is isolated away from the clutch disc 17 against a spring force of the spring 20.

The clutch disc 17, the pressure plate 19, the spring 20, and the coil 21 form an electromagnetic clutch (to be simply referred to as a clutch hereinafter) 22. When the coil 21 is not energized, the clutch disc 17 and the pressure plate 19 are contacted to each other by the spring force of the spring 20 to be rotated integrally. When the coil 21 is energized, a torque transmitting capacity between the clutch disc 17 and the pressure plate 19 is changed in accordance with the electric power applied to the coil 21.

Thus, the first motor 2R and the second motor 2L can be rotated integrally while transmitting a torque therebetween by frictionally engaging the pressure plate 19 and the clutch disc 17 without energizing the coil 21. A torque transmitting capacity between the pressure plate 19 and the clutch disc 17 can be reduced by energizing the coil 21. As a result, the first motor 2R and the second motor 2L rotate relatively to each other whereby a torque transmitted between the first motor 2R and the second motor 2L can be reduced.

The brake torque applied to the drive wheels 11R and 11L cannot be maintained when the power is off to park the vehicle. In order to maintain a frictional contact between the first brake rotor 12R and the first brake stator 13R thereby halting the drive wheels 11R and 11L even when the power is off, the drive unit 1 is provided with a parking lock device 23. Specifically, the parking lock device 23 comprises an annular movable plate 24 opposed to the first brake rotor 12R across the first brake stator 13R, a feed screw mechanism 25, and a brake motor 26 that actuates the feed screw mechanism 25.

The feed screw mechanism 25 is adapted to translate a rotary motion of the brake motor 26 into a linear motion thereby pushing the movable plate 24 toward the first brake stator 13R so as to bring the first brake stator 13R into frictional contact to the first brake rotor 12R. That is, the feed screw mechanism 25 keeps the first output shaft 3R stopping even if current supply to the brake motor 26 is interrupted. Thus, the feed screw mechanism 25 generates forward thrust force by generating forward torque by the brake motor 26, and the forward thrust force is applied to the first brake stator 13R. Consequently, the first brake stator 13R is frictionally engaged with the first brake rotor 12R to halt the first output shaft 3R. By contrast, the first output shaft 3R is allowed to rotate by generating a reverse torque by the brake motor 26 to withdraw the first brake stator 13R from the first brake rotor 12R. That is, the brake force for stopping the rotation of the first output shaft 3R is cancelled.

Specifically, reversed efficiency of the feed screw mechanism 25 to translate the linear motion into the rotational motion is adjusted to be lower than forward efficiency to translate the rotational motion into the linear motion. According to an embodiment, therefore, the first output shaft 3R may be halted by pushing the movable plate 24 and the first brake stator 13R toward the first brake rotor 12R by the feed screw mechanism 25. Therefore, the first output shaft 3R may be halted by the parking lock device 23 even if the current supply to the first coil 14R and the brake motor 26 is stopped while the feed screw mechanism 25 is operated by the brake motor 26 to halt the first output shaft 3R.

Thus, when the vehicle is parked, the current supply to the coil 21 is stopped and hence the clutch 22 is brought into engagement. In this situation, therefore, rotation of the second output shaft 3L is also stopped by stopping the rotation of the first output shaft 3R by the parking lock device 23. In other words, the brake torques applied to the drive wheels 11R and 11L can be maintained. The parking lock device 23 may be arranged in such a manner as to stop the rotation of the second output shaft 3L, or may be arranged in such a manner as to stop the rotation of the first countershaft 5R instead of the first output shaft 3R, for example.

As described, in the drive unit 1, the right and the left drive wheels 11R and 11L may be rotated integrally to propel the vehicle by engaging the clutch 22 completely to apply the same torques to the right and the left drive wheels 11R and 11L. For example, the vehicle can be propelled by a torque generated by at least one of the first motor 2R and the second motor 2L. In this case, the torque generated by one of the first motor 2R and the second motor 2L may be regenerated partially by the other one of the motors. Further, one of the first motor 2R and the second motor 2L can generate a large torque, and the other one of the motors can generate a torque in an amount corresponding to the shortage. Thus, output torques of the motors 2R and 2L can be adjusted as appropriate.

When the right and the left drive wheels 11R and 11L are rotated relative to each other during turning or the other like occasions, or when differentiating torques transmitted to the right and the left drive wheels 11R and 11L, the vehicle can be propelled by generating a torque by at least one of the motors 2R and 2L while causing a slip in the clutch 22. Further the vehicle can be propelled by generating the drive torque by one of the motors 2R and 2L while regenerating part of the drive torque by the other one of the motors 2R and 2L. For this purpose, the output torques of the motors 2R and 2L can be adjusted as appropriate.

When a speed difference or a torque difference between the right and the left drive wheels 11R and 11L is equal to or greater than a predetermined value, the outputs of the right and the left drive wheels 11R and 11L may be appropriately adjusted by completely disengaging the clutch 22. In this situation, for example, the motor 2R (2L) connected to the outer wheel may be operated as a motor and the motor 2R (2L) connected to the inner wheel may be operated as a generator. Instead, only the motor 2R (2L) connected to the outer wheel may be operated to generate a torque.

Figure 2:
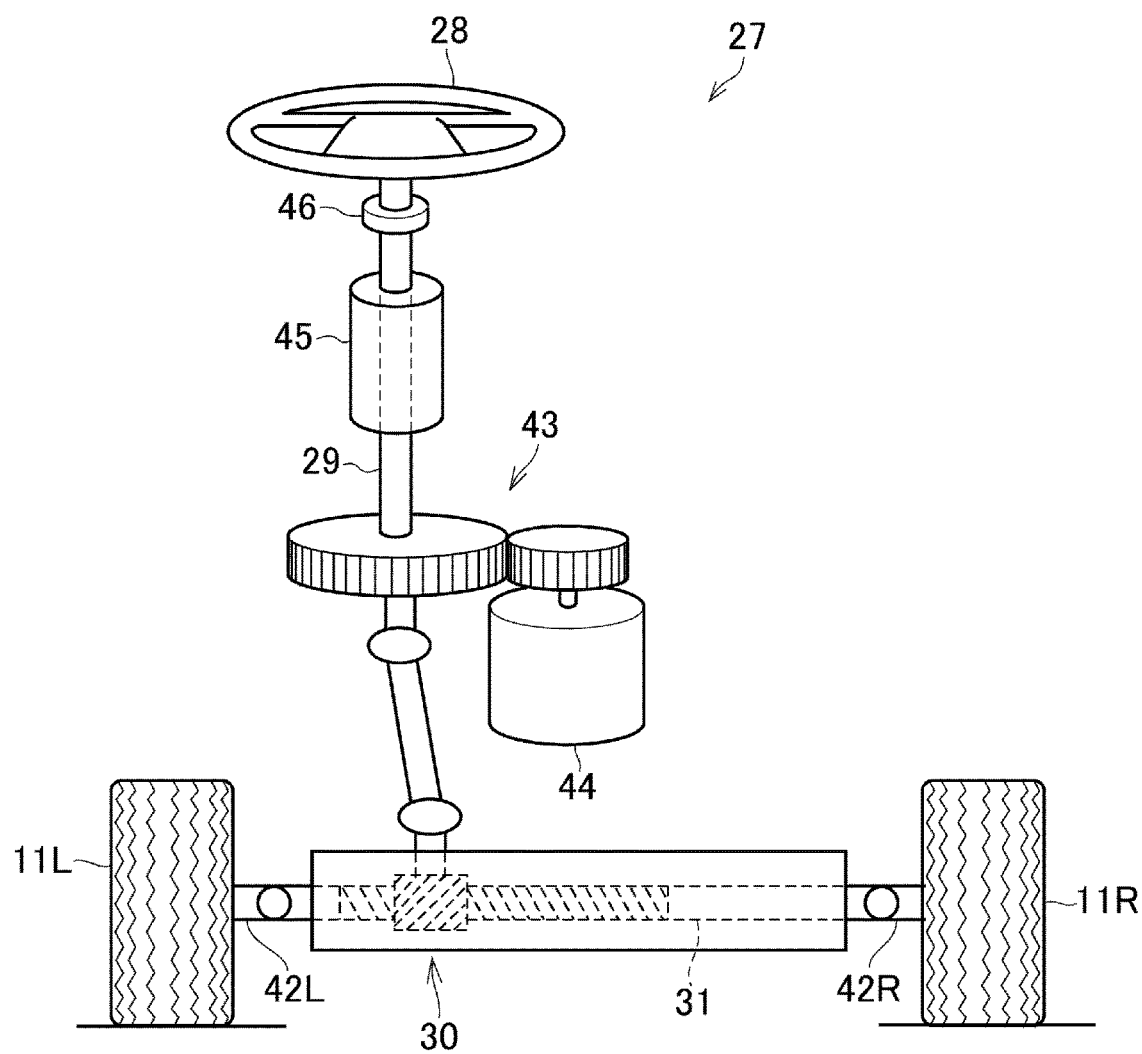
FIG. 2 is a schematic illustration showing a structure of a steering device of the vehicle to which the control system according to the embodiment is applied.

The front wheels 11R and 11L are turned by a steering device 27 shown in FIG. 2 in accordance with the operation amount (turning angle) of the steering wheel 28.

In the steering device 27, a rotation of the steering shaft 29 connected to the steering wheel 28 is transmitted the to a rack bar 31 of a transmission mechanism such as a rack and pinion mechanism 30. A right drive wheel 11R is connected to a right end of the rack bar 31 through a right tie rod 42R and a knuckle (not shown), and a left drive wheel 11L is connected to a left end of the rack bar 31 through a left tie rod 42L and a knuckle (not shown).

An electric power steering motor (to be abbreviated as the "EPS motor" hereinafter) 44 as an actuator is connected to the steering shaft 29 via a speed reducer 43, and torque of the steering shaft 29 is increased by an output torque of the EPS motor 44.

A steering torque sensor 45 that detects a torque of the steering shaft 29, and a steering angle sensor 46 that detects a turning angle of the steering shaft 29 are arranged on the steering shaft 29 between the steering wheel 28 and the speed reducer 43.

In the steering device 27, orientations of the right front wheel 11R and the left front wheel 11L are turned by rotational motion (i.e., torque) of the steering wheel 28 transmitted through the rack and pinion mechanism 30. In order to reduce an effort of the driver to turn the front wheels 11R and 11L by rotating the steering wheel 28, the EPS motor 44 generates an assist torque to rotate the steering wheel 28 in accordance with a torque detected by the steering torque sensor 45.

Figure 3:
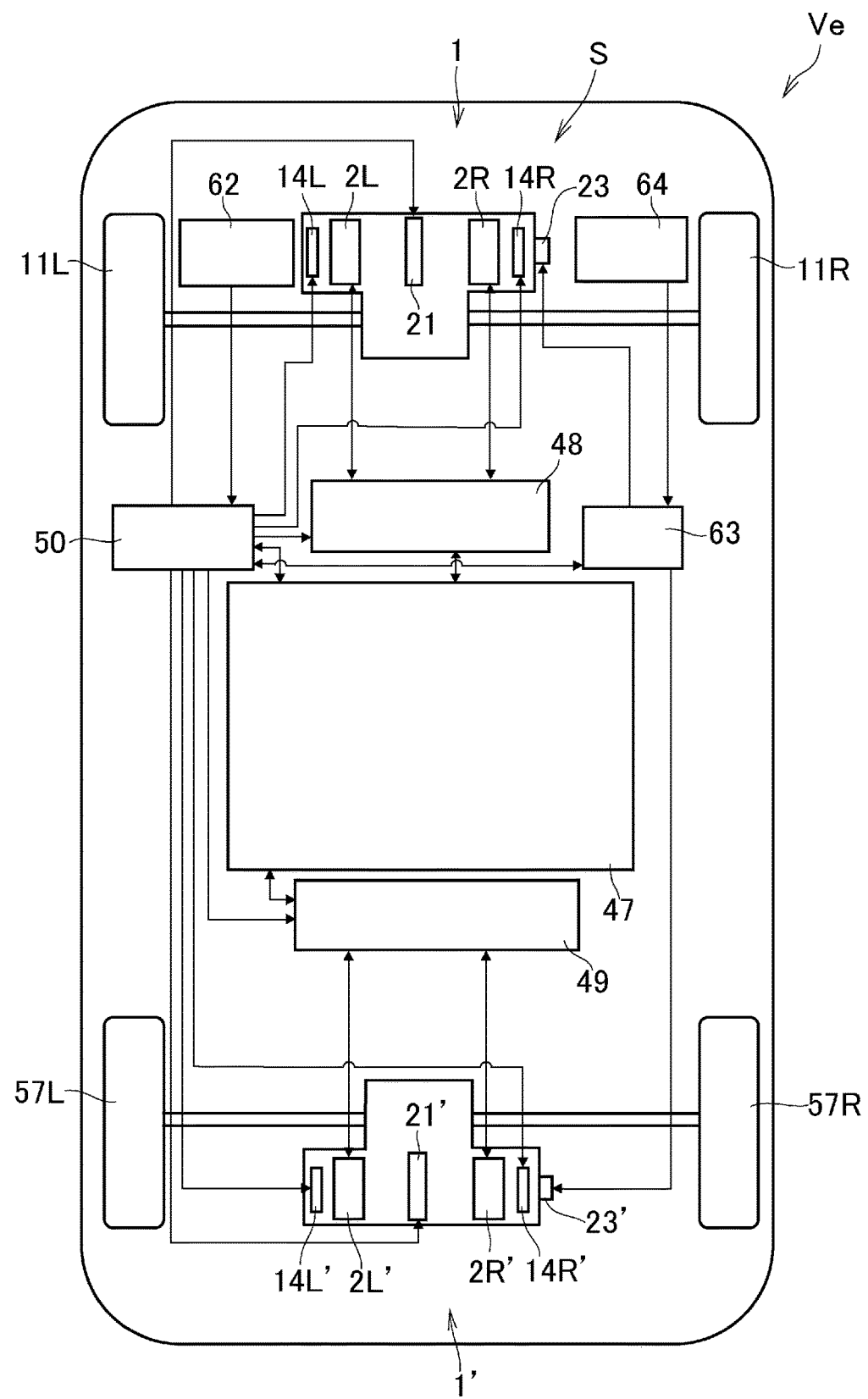
FIG. 3 is a schematic illustration showing one example of a structure of the vehicle to which the control system according to the embodiment is applied.

Next, an example of a configuration of a control system S for a vehicle Ve including the drive unit 1 described above will be described. FIG. 3 is a diagram schematically showing an example of the configuration of the system. As illustrated in FIG. 3, the vehicle Ve is a four wheel drive (4WD) layout vehicle in which a first drive unit 1 is arranged in the front side of the vehicle Ve and a second drive unit 1' is arranged in the rear side of the vehicle Ve substantially symmetrical across the longitudinal center of the vehicle Ve. In the following explanation, the members of the second drive unit 1' with the same configuration as the members (including the first motor 2R) provided in a torque transmission path between the first motor 2R and the right drive wheel 11R in the first drive unit 1 will be called the "third member". The members of the first drive unit 1 with the same configuration as the members (including the second motor 2L) provided in a torque transmission path between the second motor 2L and the left drive wheel 11L in the first drive unit 1 will be called the "fourth member". The clutch and the parking lock device in the second drive unit 1', as well as the members of these, will be called a "second clutch", a "second parking lock device", and the "second member". The apostrophe on the reference numeral designates members of the second drive unit 1', for the distinction from the members of the first drive unit 1.

In the first drive unit 1, the first motor 2R, the second motor 2L, and the coils 14R, 14L, and 21 receive electric power from a high-voltage power storage device 47 including a battery and a capacitor, as a conventional power storage device used in hybrid vehicles and electric vehicles. Likewise, in the second drive unit 1', the first motor 2R', the second motor 2L', and the coils 14R', 14L', and 21' also receive the electric power from the power storage device 47. The power storage device 47 is charged with the power generated by the motors 2R, 2L, 2R', and 2L'.

A first inverter 48 is interposed between the power storage device 47 and the motors 2R and 2L, and the first inverter 48 is adapted to switch between direct current and alternate current, and to control values and frequencies of current supplied to the motors 2R and 2L. The second drive unit 1' is also provided with a second inverter 49 that can control a value and a frequency of the current supplied to the motors 2R' and 2L'.

Figure 4:
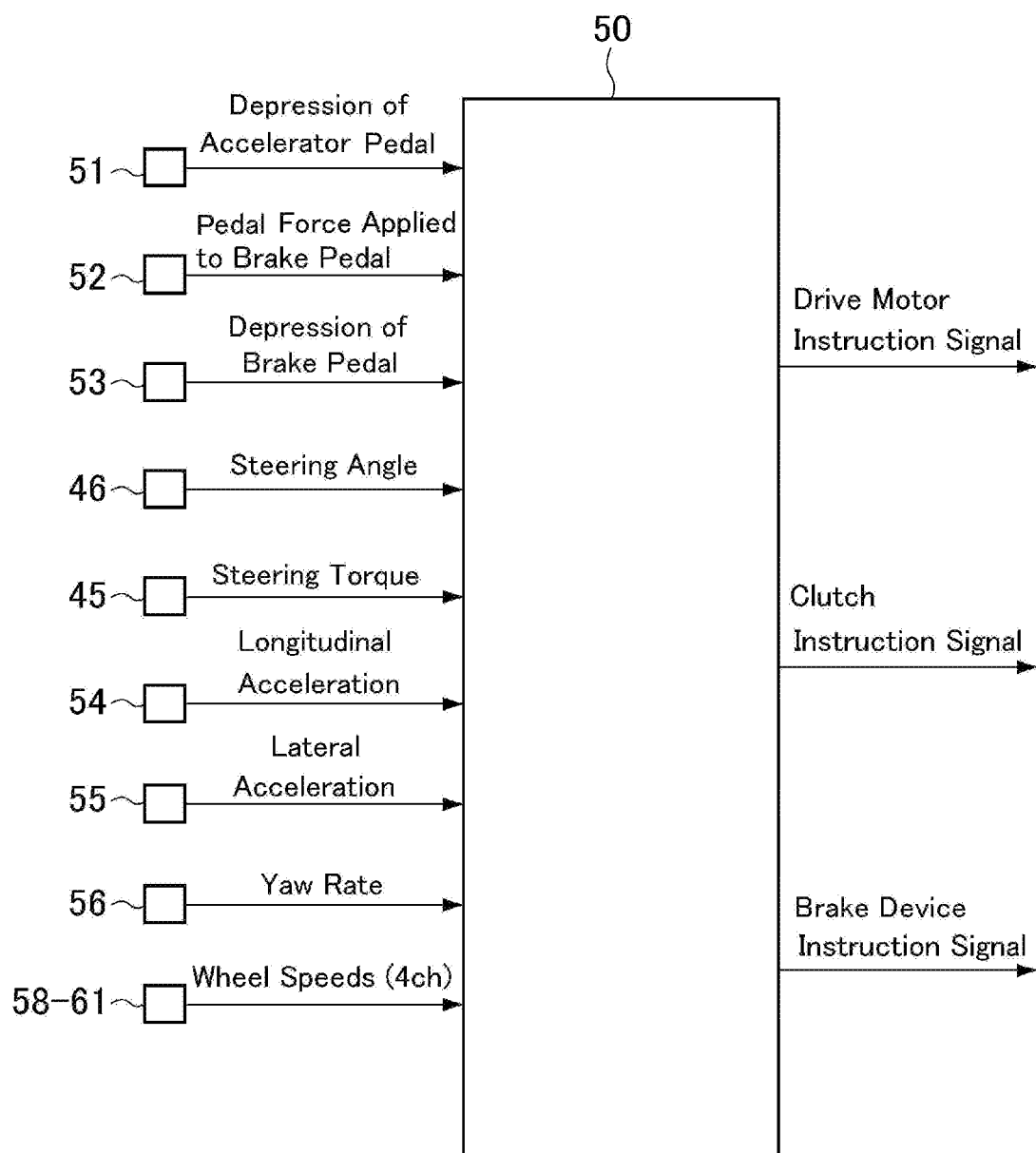
FIG. 4 is a block diagram showing functions of a first ECU.

A first electronic control unit 50 (to be abbreviated as the "first ECU" hereinafter) is provided to control the motors 2R and 2L and the coils 14R, 14L, and 21 of the first drive unit 1, as well as the motors 2R' and 2L' and the coils 14R', 14L', and 21' of the second drive unit 1'. The first ECU 50 as a "controller" of the embodiment mainly includes a microcomputer as in any known ECUs installed in vehicles. FIG. 4 is a block diagram showing functions of the first ECU 50.

Signals representing posture of the vehicle Ve and operating conditions are sent to the first ECU 50, and the first ECU 50 transmits control signal to the first inverter 48 and the second inverter 49 based on the incident signals, preinstalled formulas and maps, and the like. The control signals sent from the first ECU 50 to the first inverter 48 and the second inverter 99 are obtained while taking account of conventionally known Antilock Brake system (ABS), Traction Control (TRC), Electronic Stability Control (ESC), Dynamic Yaw rate Control (DYC), and the like.

For example, the first ECU 50 receives signals from an accelerator sensor 51 that detects a depression of an accelerator pedal, a first brake pedal sensor 52 that detects a pedal force applied to the brake pedal, a second brake pedal sensor 53 that detects a depression of the brake pedal, a steering angle sensor 46 that detects a steering angle of the steering wheel 28, and the steering torque sensor 45 that detects a steering torque of the steering wheel 28. The first ECU 50 also receives signals representing data about the posture of the vehicle Ve, from a first G sensor 54 that detects longitudinal acceleration of the vehicle Ve, a second G sensor 55 that detects lateral acceleration of the vehicle Ve, a yaw rate sensor 56 that detects a yaw rate of the vehicle Ve, and wheel speed sensors 58, 59, 60, and 61 that respectively detect rim speeds of the right front wheel 11R, the left front wheel 11L, the right rear wheel 57R, and the left rear wheel 57L.

A first auxiliary battery 62 is provided to supply power for operating the first ECU 50 and for controlling a transistor (not illustrated) installed in the first inverter 48. The first auxiliary battery 62 is set to be at a lower voltage than the power storage device 27.

To this end, in the example illustrated in FIG. 3, a second ECU 63 is provided independently from the first ECU 50. In order to control a brake force in the event of failure of the first ECU 50, the second ECU 63 is electrically connected to the parking lock devices 23 and 23' (specifically, the brake motors 26 and 26'), and a second auxiliary battery 64 is connected to the second ECU 45.

Figure 5:
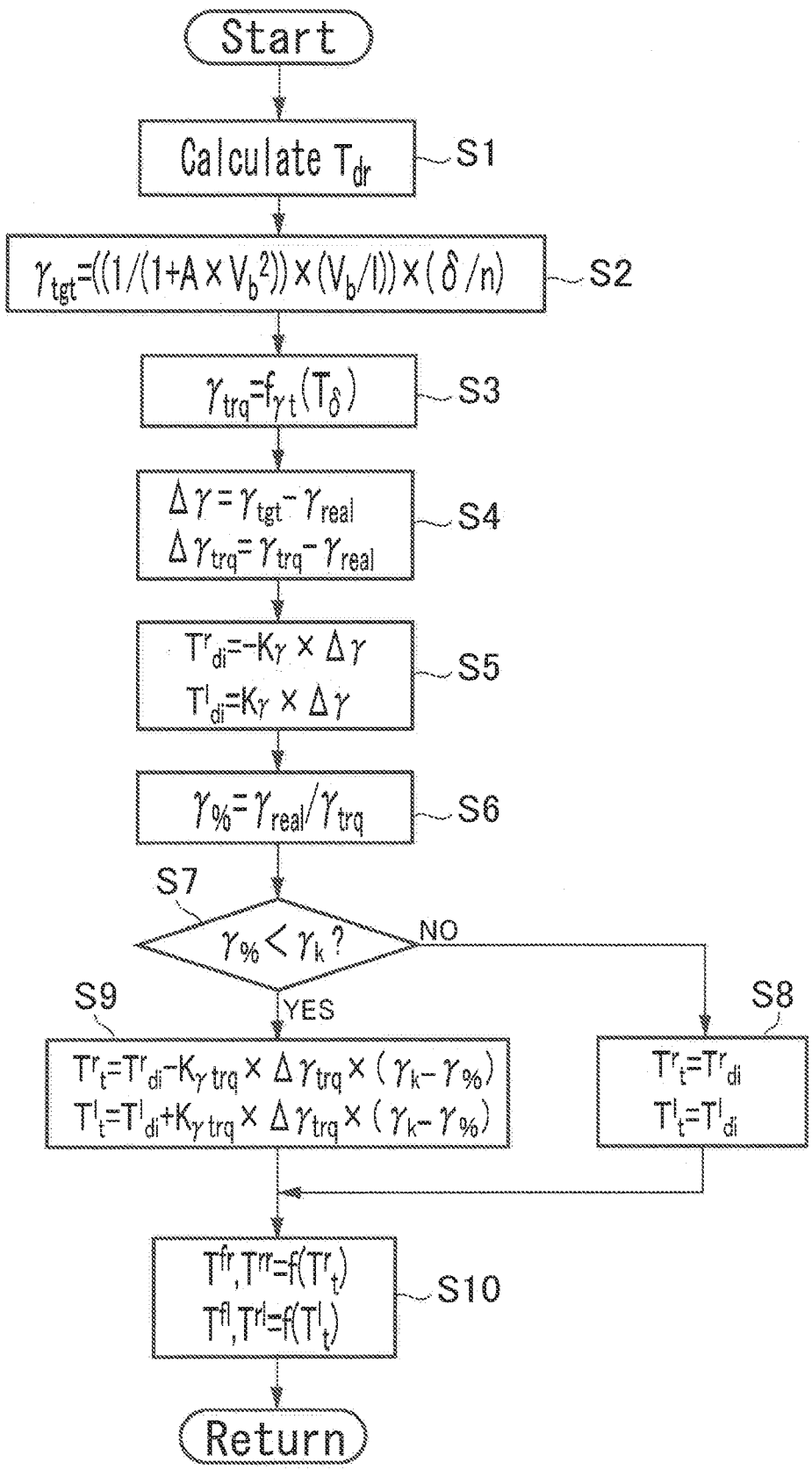
FIG. 5 is a flowchart showing a routine according to the first control example.

Next, a control example for determining the output of each of the motors 2R, 2L, 2R', and 2L' will be described with reference to FIG. 5. The routine illustrated in FIG. 5 is executed by the first ECU 50. At step S1, a required torque $T_{dr}$ of the vehicle Ve is calculated based on a position of the accelerator pedal, a depression of the brake pedal or a pedal force applied to the brake pedal, wheel speeds, a longitudinal acceleration, and so on. Details of calculation at step S1 is described in Japanese Patent Application No. 2015-253254.

Then, in order to improve a turning stability by executing the Electronic Stability Control (ESC) and Dynamic Yaw rate Control (DYC), a first target torque $T^r_t$ of the right pair drive of wheels as a total value of a torque of the right front wheel 11R and a torque of the right rear wheel 57R is calculated, and a second target torque $T^l_t$ of the left pair of wheels as a total value of a torque of the left front wheel 11L and a torque of the left rear wheel 57L is calculated. Specifically, the first target torque $T^r_t$ and the second target torque $T^l_t$ are calculated based on an actual yaw rate detected by the yaw rate sensor 56.

In order to obtain the first target torque $T^r_t$ and the second target torque $T^l_t$, at step S2, a first target yaw rate $\gamma_{tgt}$ is calculated based on a steering angle $\delta$ of the steering wheel 28, using the following formula:

$$\gamma_{tgt}=((1/(1+A \cdot V_b^2)) \cdot (V_b/l)) \cdot (\delta/n),$$

where "A" is a target stability factor; "l" is a wheelbase, and "n" is a steering gear ratio calculated based on a ratio between a rotational angle of the steering shaft 29 and a turning angle of the pair of front wheels 11R and 11L.

Figure 6:
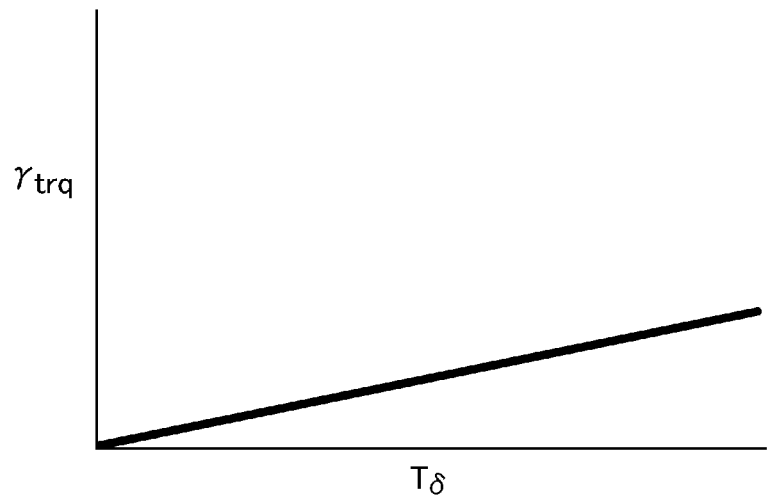
FIG. 6 shows a first example of a map for determining a second target yaw rate.

Then, at step S3, a second target yaw rate $\gamma_{trq}$ is calculated based on a steering torque $T_\delta$ of the steering shaft 29 with reference to a map installed in the first ECU 50. Such map for calculating the second target yaw rate $\gamma_{trq}$ is prepared based on a result of an experiment or a simulation, and an example of the map is shown in FIG. 6. In FIG. 6, the horizontal axis represents the steering torque $T_\delta$, and the vertical axis represents the second target yaw rate $\gamma_{trq}$. As indicated in FIG. 6, the second target yaw rate $\gamma_{trq}$ is increased proportionally with an increase in the steering torque $T_\delta$.

Then, at step S4, a first difference $\Delta\gamma$ between the first target yaw rate $\gamma_{tgt}$ and an actual yaw rate $\gamma_{real}$ detected by the yaw rate sensor 56, and a second difference $\Delta\gamma_{trq}$ between the second target yaw rate $\gamma_{trq}$ and the actual yaw rate $\gamma_{real}$ are calculated.

Then, at step S5, a first output torque $T^r_{di}$ of the right pair of wheels 11R, 57R and a second output torque $T^l_{di}$ of the left pair of wheels 11L, 57L to achieve the first target yaw rate $\gamma_{tgt}$ are calculated using the following formulas:

$$T^r_{di} = -K_\gamma \cdot \Delta\gamma; \text{ and}$$

$$T^l_{di} = K_\gamma \cdot \Delta\gamma.$$

where $K_\gamma$ is a coefficient to translate a yaw rate into a torque, and is stored in the first ECU 50.

Such calculation at step S5 is executed to obtain an increasing amount of the first output torque $T^r_{di}$, and to obtain a reducing amount of the second output torque $T^l_{di}$. Specifically, absolute values of the first output torque $T^r_{di}$ and the second output torque $T^l_{di}$ are identical to each other.

Then, at step S6, a ratio $\gamma_{\%}$ of an actual yaw rate $\gamma_{real}$ to the second target yaw rate $\gamma_{trq}$ is calculated. Thereafter, in order to determine whether the EPS motor 44 works properly, the routine progresses to step S7 to determine whether the ratio $\gamma_{\%}$ calculated at step S6 is smaller than a predetermined value $\gamma_k$.

For example, if the performance of the EPS motor 44 is reduced with time, a greater torque is required to increase or maintain the steering angle $\delta$ of the steering wheel 28. That is, the torque of the steering shaft 29 is increased. Consequently, the second target yaw rate $\gamma_{trq}$ is increased with an increase in the torque of the steering shaft 29 and the ratio $\gamma_{\%}$ is decreased. Therefore, the predetermined value $\gamma_k$ is set to a value possible to determine that the performance of the EPS motor 44 is reduced lower than a lower limit value of an allowable performance.

Alternatively, it is also possible to obtain a difference between the second target yaw rate $\gamma_{trq}$ and the actual yaw rate $\gamma_{real}$ at step S6, and to determine whether the difference is greater than a predetermined value at step S7.

If the ratio $\gamma_{\%}$ calculated at step S6 is greater than the predetermined value $\gamma_k$ so that the answer of step S7 is NO, the routine progresses to step S8 to employ the first output torque $T^r_{di}$ as the first target torque $T^r_t$ of the right pair of wheels 11R, 57R, and to employ the second output torque $T^l_{di}$ as the second target torque $T^l_t$ of the left pair of wheels 11L, 57L.

By contrast, if the ratio $\gamma_{\%}$ calculated at step S6 is smaller than the predetermined value $\gamma_k$ so that the answer of step S7 is YES, the routine progresses to step S9 to correct the first output torque $T^r_{di}$ and the second output torque $T^l_{di}$ based on the second target yaw rate $\gamma_{trq}$. The corrected first output torque $T^r_{di}$ is employed as the first target torque $T^r_t$ of the right pair of wheels 11R, 57R, and the corrected second output torque $T^l_{di}$ is employed as the second target torque $T^l_t$ of the left pair of wheels 11L, 57L. At step S9, specifically, the first output torque $T^r_{di}$ and the second output torque $T^l_{di}$ are corrected as expressed by the following expressions:

$$T^r_t = T^r_{di} - K\gamma_{trq} \cdot \Delta\gamma_{trq} \cdot (\gamma_k - \gamma_{\%}); \text{ and}$$

$$T^l_t = T^l_{di} - K\gamma_{trq} \cdot \Delta\gamma_{trq} \cdot (\gamma_k - \gamma_{\%}),$$

where $K\gamma_{trq}$ is a coefficient to translate a yaw rate into a torque. Thus, at step S9, one of the first output torque $T^r_{di}$ and the second output torque $T^l_{di}$ calculated at step S5 is increased and the other output torque $T^r_{di}$ or $T^l_{di}$ is reduced thereby increasing the yaw rate. In the case that the first output torque $T^r_{di}$ and the second output torque $T^l_{di}$ are thus corrected at step S9, the first target torque $T^r_t$ and the second target torque $T^l_t$ are set individually to the corrected output torques $T^r_{di}$ and $T^l_{di}$ until the steering torque $T_\delta$ is reduced smaller than a predetermined value, in other words, until a turning operation is terminated. In this case, therefore, the routine will not progress from step S7 to step S8 unintentionally in the next routine and hence the desired yaw rate can be achieved certainly until the turning operation is terminated. The first target torque $T^r_t$ set to the first output torque $T^r_{di}$ corrected at step S9 corresponds to a third target torque of the embodiment, and the second target torque $T^l_t$ set to the second output torque $T^l_{di}$ corrected at step S9 corresponds to a fourth target torque of the embodiment.

Then, at step S10, target output torques $T^{fr}$, $T^{fl}$, $T^{rr}$, and $T^{rl}$ of the motors 2R, 2L, 2R', and 2L', and a torque transmitting capacity of the clutch 22 are calculated based on the target torques $T^r_t$ and $T^l_t$ calculated at step S8 or S9, taking account of taking account of a change in a vertical force at each wheel during propulsion and braking, and a slip rate between a road surface and each wheel. Thereafter, command signals for controlling the target output torques $T^{fr}$, $T^{fl}$, $T^{rr}$, and $T^{rl}$ of the motors 2R, 2L, 2R', and 2L', and the torque transmitting capacity of the clutch 22 are transmitted to the motors 2R, 2L, 2R' and the clutch 22, and the routine returns.

Details of such calculation of the target output torques $T^{fr}$, $T^{fl}$, $T^{rr}$, and $T^{rl}$ of the motors 2R, 2L, 2R', and 2L' are described e.g., in JP-A-2015-253254.

Figure 7:
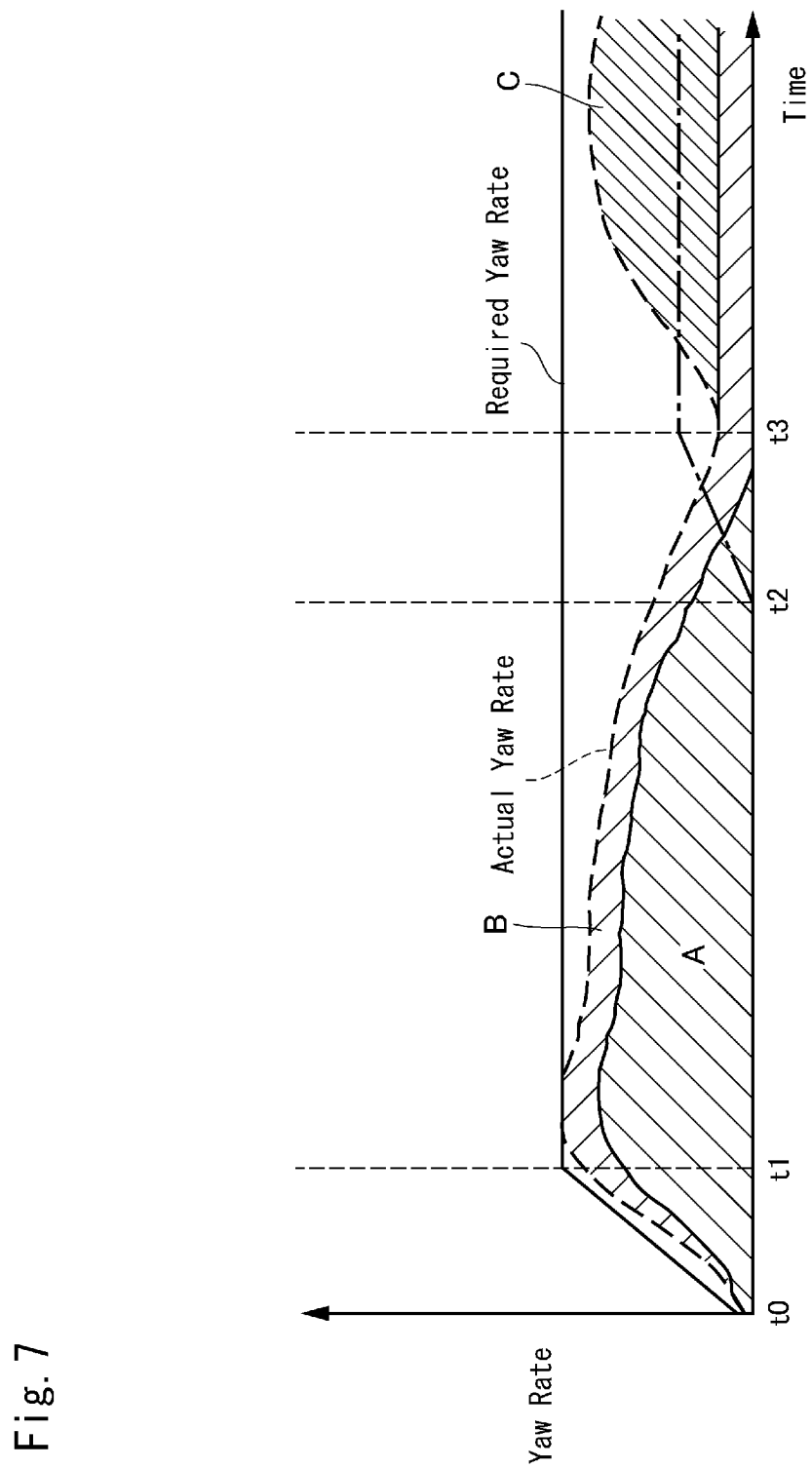
FIG. 7 is a time chart showing a temporal change in the yaw rate during execution of the first control example.

Temporal change in the yaw rate during execution of the routine shown in FIG. 5 is indicated in FIG. 7.

In FIG. 7, the solid line represents a required yaw rate by the driver, and the required yaw rate is increased from point t0 to a predetermined value, and maintained from point t2.

That is, the driver starts rotating the steering wheel 28 at point t0, and the yaw rate is increased with an increase in the steering angle $\delta$. In FIG. 7, the region A indicates such yaw rate changed in accordance with the steering angle $\delta$, and in the following explanation, such yaw rate changed in accordance with the steering angle $\delta$ will be called the first yaw rate.

During a period from point t0 to point t1, the EPS motor 44 works properly and hence the steering torque $T_\delta$ is relatively small. In this situation, therefore, the second target yaw rate $\gamma_{trq}$ calculated at step S3 is small and the routine progresses from step S7 to step S8. Consequently, the first target torque $T^r_t$ of the right pair of wheels 11R, 57R, and the second target torque $T^l_t$ of the left pair of wheels 11L, 57L are set in such a manner as to achieve a yaw rate in the amount of the difference $\Delta\gamma$ between the first target yaw rate $\gamma_{tgt}$ calculated based on the steering angle $\delta$ and the actual yaw rate $\gamma_{real}$. In FIG. 7, the region B indicates such yaw rate in the amount of the difference $\Delta\gamma$, and in the following explanation, such yaw rate in the amount of the difference $\Delta\gamma$ will be called the second yaw rate.

A reduction in performance of the EPS motor 44 starts from point t1 and hence an output torque of the EPS motor 44 is reduced from point t1. In this situation, if the steering wheel 28 is held by a constant torque of the driver, a total torque to maintain the steering angle δ of the steering wheel 28, in other words, to maintain a turning angle of the steered wheels will be reduced. Consequently, the steering angle δ of the steering wheel 28 will be reduced undesirably. As a result, although the required yaw rate is constant, the first yaw rate and the actual yaw rate $\gamma_{real}$ are reduced gradually from point t1. In this situation, the first target yaw rate is also reduced.

When the driver starts increasing the torque applied to the steering wheel 28 to increase the steering angle δ from point t2, the second target yaw rate $\gamma_{trq}$ indicated by the dashed-dotted line is increased from point t2. However, since the performance of the EPS motor 44 is reduced, the steering angle δ of the steering wheel 28 cannot be increased. In this situation, therefore, the actual yaw rate $\gamma_{real}$ keeps falling even after point t2.

When the second target yaw rate $\gamma_{trq}$ is increased with an increase in the torque applied to the steering wheel 28 so that the ratio $\gamma_{\%}$ of the actual yaw rate $\gamma_{real}$ to the second target yaw rate $\gamma_{trq}$ exceeds the predetermined value $\gamma_k$ at point t3, the routine progresses from step S7 to step S9. Consequently, the first output torque $T^r_{di}$ and the second output torque $T^l_{di}$ calculated at step S5 are corrected based on the second target yaw rate $\gamma_{trq}$. Specifically, the first output torque $T^r_{di}$ and the second output torque $T^l_{di}$ are corrected in such a manner as to increase the actual yaw rate $\gamma_{real}$ with an increase in the steering angle δ. As a result, the actual yaw rate $\gamma_{real}$ is increased from point t3 so that the difference between the required yaw rate and the actual yaw rate $\gamma_{real}$ is reduced. In FIG. 7, the region C indicates the yaw rate thus increased by correcting the first output torque $T^r_{di}$ and the second output torque $T^l_{di}$ based on the second target yaw rate $\gamma_{trq}$.

By thus executing the routine shown in FIG. 5, an additional yaw rate can be achieved in accordance with a torque difference between the right pair of wheels and the left pair of wheels in addition to a yaw rate achieved in accordance with a turning angle of the steered wheels, even when the steering wheel 28 cannot be rotated to a desired angle due to reduction in performance of the EPS motor 44. In other words, the desired yaw rate can be achieved by adjusting the torques of the right pair of wheels and the left pair of wheels even in the event of failure of the EPS motor 44.

Figure 8:
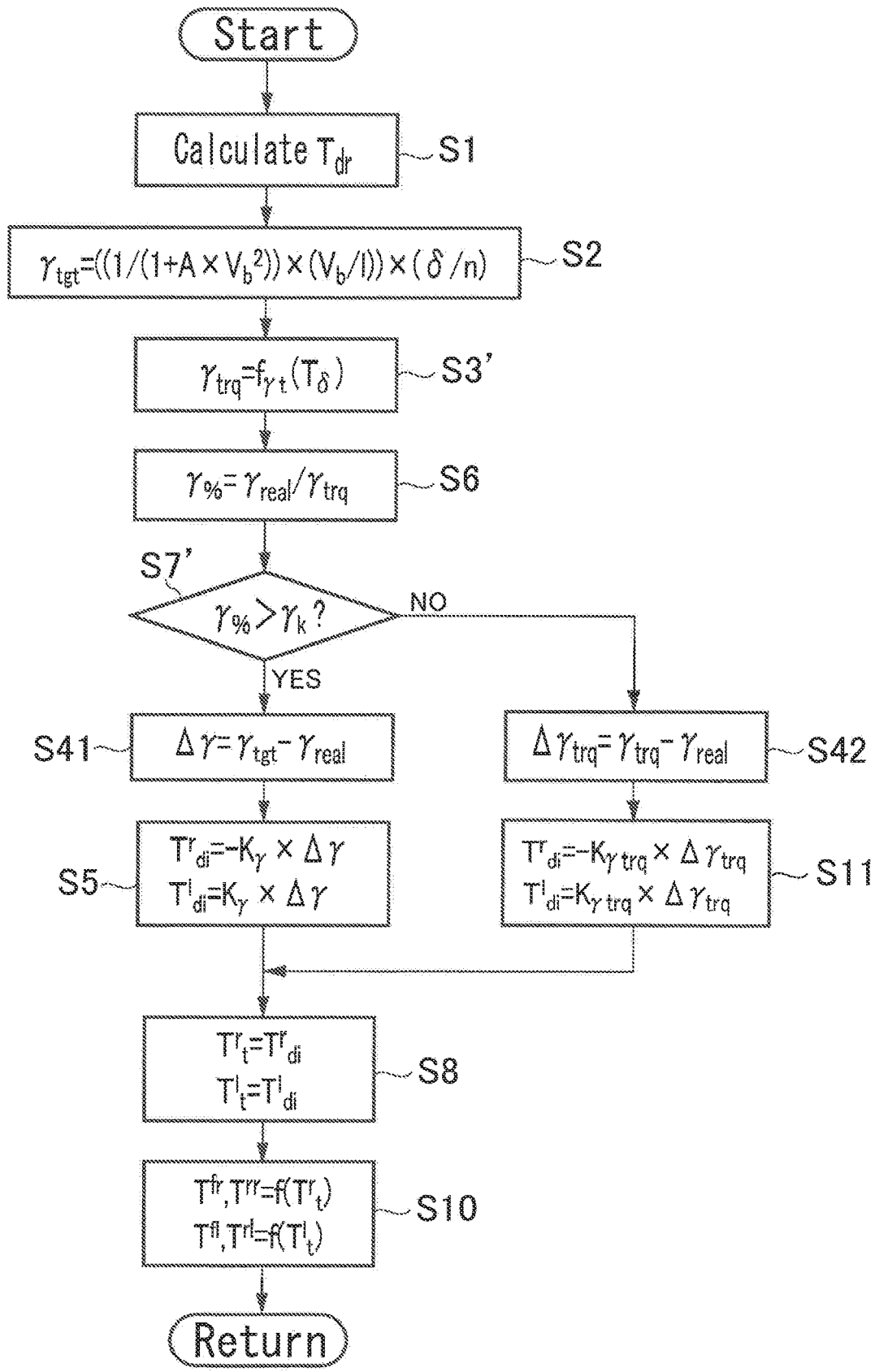
FIG. 8 is a flowchart showing a routine according to the second control example.

Turning to FIG. 8, there is shown a routine according to the second control example. According to the second control example, in the event of failure of the EPS motor 44, the first target torque $T^r_t$ of the right pair of wheels 11R, 57R and the second target torque $T^l_t$ of the left pair of wheels 11L, 57L are calculated based only on the second target yaw rate $\gamma_{trq}$. In the following explanations, detailed explanation for the common steps as the routine shown in FIG. 5 will be omitted.

In the routine shown in FIG. 8, a required torque $T_{dr}$ of the vehicle Ve is also calculated at step S1, and a first target yaw rate $\gamma_{tgt}$ is also calculated at step S2.

Then, at step S3', a second target yaw rate $\gamma_{trq}$ is calculated based on a steering torque $T_δ$ of the steering wheel 28. As described, in the routine shown in FIG. 8, the first target torque $T^r_t$ and the second target torque $T^l_t$ are calculated based only on the second target yaw rate $\gamma_{trq}$ in the event of failure of the EPS motor 44. At step S3', therefore, the second target yaw rate $\gamma_{trq}$ is calculated with reference to a different map shown in FIG. 9 that is also installed in the first ECU 50.

Figure 9:
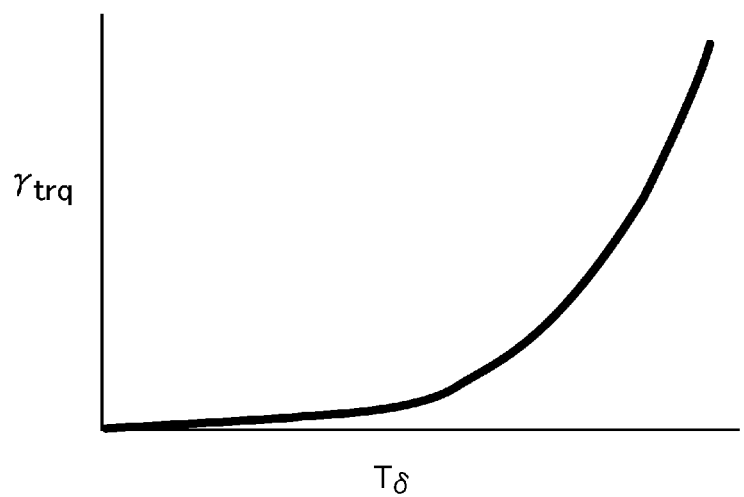
FIG. 9 shows a second example of a map for determining a second target yaw rate.

As can be seen from FIG. 9, the second target yaw rate $\gamma_{trq}$ is increased exponentially with an increase in the steering torque $T_δ$ detected by the steering torque sensor 45. Specifically, if the steering torque $T_δ$ is relatively small, there is little difference between the second target yaw rate $\gamma_{trq}$ calculated with reference to the map shown in FIG. 9 and the second target yaw rate $\gamma_{trq}$ calculated with reference to the map shown in FIG. 6. However, if the steering torque $T_δ$ is relatively large, the second target yaw rate $\gamma_{trq}$ calculated with reference to the map shown in FIG. 9 is significantly greater than the second target yaw rate $\gamma_{trq}$ calculated with reference to the map shown in FIG. 6. The map shown in FIG. 9 is also prepared based on a result of an experiment or a simulation.

Then, at step S6, a ratio $\gamma_{\%}$ of an actual yaw rate $\gamma_{real}$ to the second target yaw rate $\gamma_{trq}$ is also calculated, and the routine progresses to step S7' to determine whether the ratio $\gamma_{\%}$ calculated at step S6 is smaller than the predetermined value $\gamma_k$. If the ratio $\gamma_{\%}$ calculated at step S6 is greater than the predetermined value $\gamma_k$ so that the answer of step S7' is YES, this means that the EPS motor 44 currently works properly. In this case, therefore, the target output torques $T^{fr}$, $T^{fl}$, $T^{rr}$, and $T^{rl}$ of the motors 2R, 2L, 2R', and 2L' are calculated based only on the steering angle δ detected by the steering angle sensor 46.

In this case, the routine progresses to step S41 to calculate a first difference $Δγ$ between the first target yaw rate $\gamma_{tgt}$ and an actual yaw rate $\gamma_{real}$. Then, at step S5, a first output torque $T^r_{di}$ of the right pair of wheels 11R, 57R and a second output torque $T^l_{di}$ of the left pair of wheels 11L, 57L to achieve the first target yaw rate $\gamma_{tgt}$ calculated at step S2 are calculated.

Then, the routine progresses to step S8 to employ the first output torque $T^r_{di}$ calculated at step S5 as the first target torque $T^r_t$ of the right pair of wheels 11R, 57R, and to employ the second output torque $T^l_{di}$ calculated at step S5 as the second target torque $T^l_t$ of the left pair of wheels 11L, 57L. Thereafter, the routine progresses to step S10.

By contrast, if the ratio $\gamma_{\%}$ calculated at step S6 is smaller than the predetermined value $\gamma_k$ so that the answer of step S7' is NO, this means that the EPS motor 44 does not work properly. In this case, the routine progresses to step S42 to calculate a second difference $Δγ_{trq}$ between the second target yaw rate $\gamma_{trq}$ and the actual yaw rate $\gamma_{real}$. Then, at step S11, a first output torque $T^r_{di}$ of the right pair of wheels 11R, 57R and a second output torque $T^l_{di}$ of the left pair of wheels 11L, 57L to achieve the second target yaw rate $\gamma_{tgt}$ calculated at step S3' are calculated. At step S11, specifically, the first output torque $T^r_{di}$ and the second output torque $T^l_{di}$ are calculated as expressed by the following expressions:

$$T^r_{di} = -K\gamma_{trq} \cdot Δ\gamma_{trq}; \text{ and}$$

$$T^l_{di} = K\gamma_{trq} \cdot Δ\gamma_{trq},$$

where $K\gamma_{trq}$ is a coefficient to translate a yaw rate into a torque. In the event of failure of the EPS motor 44, the first target torque $T^r_t$ and the second target torque $T^l_t$ are set individually to the output torques $T^r_{di}$ and $T^l_{di}$ calculated at step S11 until the steering torque $T_δ$ is reduced smaller than a predetermined value, in other words, until a turning operation is terminated. In this case, therefore, the routine will not progress from step S7' to step S42 unintentionally in the next routine and hence the desired yaw rate can be achieved certainly until the turning operation is terminated.

Then, the routine progresses to step S8 to employ the first output torque T<r>di calculated at step S11 as the first target torque T<r>t of the right pair of wheels 11R, 57R, and to employ the second output torque T<l>di calculated at step S11 as the second target torque T<l>t of the left pair of wheels 11L, 57L. Thereafter, the routine progresses to step S10. The first target torque T<r>t set to the first output torque T<r>di calculated at step S11 corresponds to a third target torque of the embodiment, and the second target torque T<l>t set to the second output torque T<l>di calculated at step S11 corresponds to a fourth target torque of the embodiment.

Figure 10:
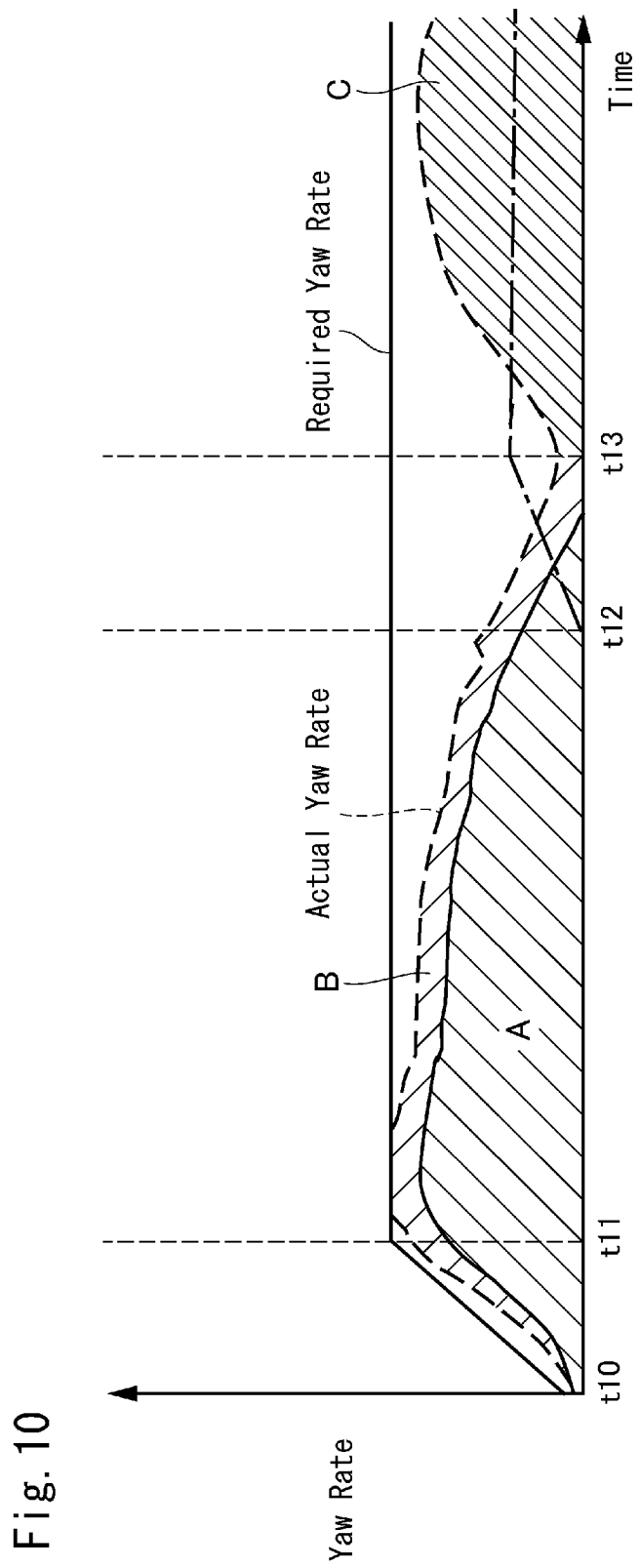
FIG. 10 is a time chart showing a temporal change in the yaw rate during execution of the second control example.

Temporal change in the yaw rate during execution of the routine shown in FIG. 8 is shown in FIG. 10. In the example shown in FIG. 10, same events as those occur during the period from point t0 to t3 in FIG. 7 also occur during a period from point t10 to t13.

When the ratio $\gamma_{\%}$ of the actual yaw rate $\gamma$ to the second target yaw rate $\gamma_{trq}$ exceeds the predetermined value $\gamma_k$ at point t13, the routine progresses from step S7' to step S42. Consequently, the first target torque $T^r_t$ of the right pair of wheels 11R, 57R, and the second target torque $T^l_t$ of the left pair of wheels 11L, 57L are calculated based on the second target yaw rate $\gamma_{trq}$. In this case, since the second target yaw rate $\gamma_{trq}$ is increased exponentially with an increase in the steering torque $T_\delta$, the second target yaw rate $\gamma_{trq}$ is set to a relatively larger value at point t13. As a result, the actual yaw rate $\gamma_{real}$ is increased from point t13 so that the difference between the required yaw rate and the actual yaw rate $\gamma_{real}$ is reduced.

By thus executing the routine shown in FIG. 8, a desired yaw rate can be achieved by controlling the a torques of the right pair of wheels and the left pair of wheels based on the second target yaw rate $\gamma_{trq}$, even when the steering wheel 28 cannot be rotated to a desired angle due to reduction in performance of the EPS motor 44.

Figure 11:
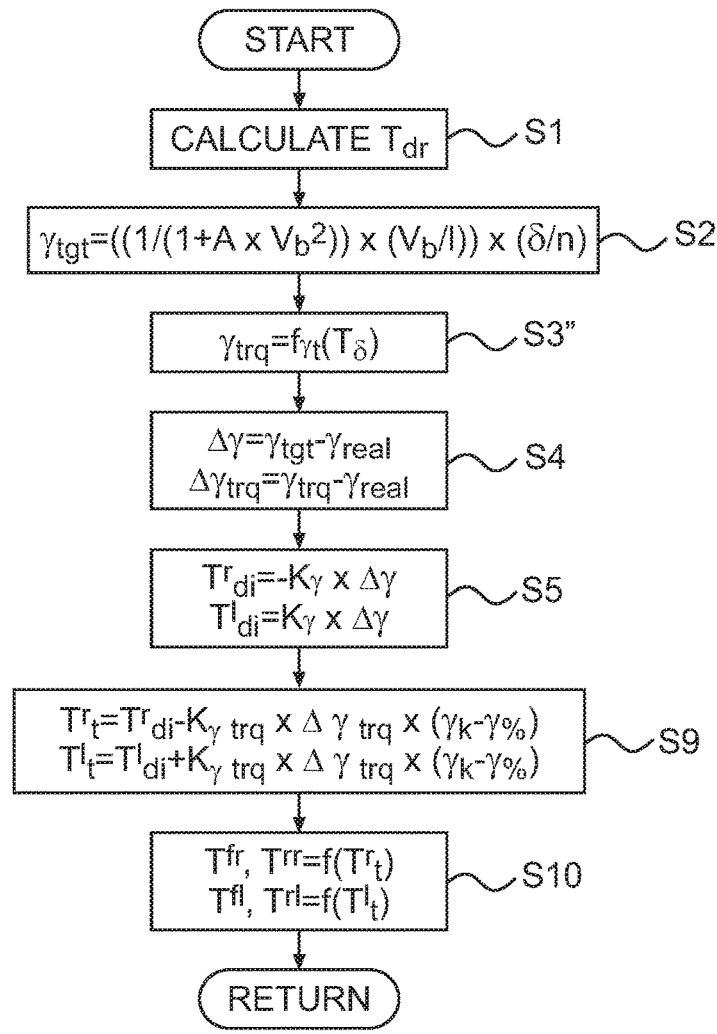
FIG. 11 is a flowchart showing a routine according to the third control example.

Turning to FIG. 11, there is shown a routine according to the third control example. In the routine shown in FIG. 11, the first target torque $T^r_t$ of the right pair of wheels 11R, 57R, and the second target torque $T^l_t$ of the left pair of wheels 11L, 57L are always calculated based on the first target yaw rate $\gamma_{tgt}$. In the following explanations, detailed explanation for the common steps as the foregoing routines will be omitted.

In the routine shown in FIG. 11, steps S1 to S5 are also executed sequentially to calculate the first target torque $T^r_t$ of the right pair of wheels 11R, 57R, and the second target torque $T^l_t$ of the left pair of wheels 11L, 57L based on the first target yaw rate $\gamma_{tgt}$. Thereafter, at steps S9 and S10, the first target torque $T^r_t$ and the second target torque $T^l_t$ are corrected based on the second target yaw rate $\gamma_{trq}$, and the target output torques $T^{fr}$, $T^{fl}$, $T^{rr}$, and $T^{rl}$ of the motors 2R, 2L, 2R', and 2L' are calculated based on the corrected target torques $T^r_t$ and $T^l_t$. Thus, in the routine shown in FIG. 11, steps S9 and S10 of the routine shown in FIG. 5 are skipped.

Figure 12:
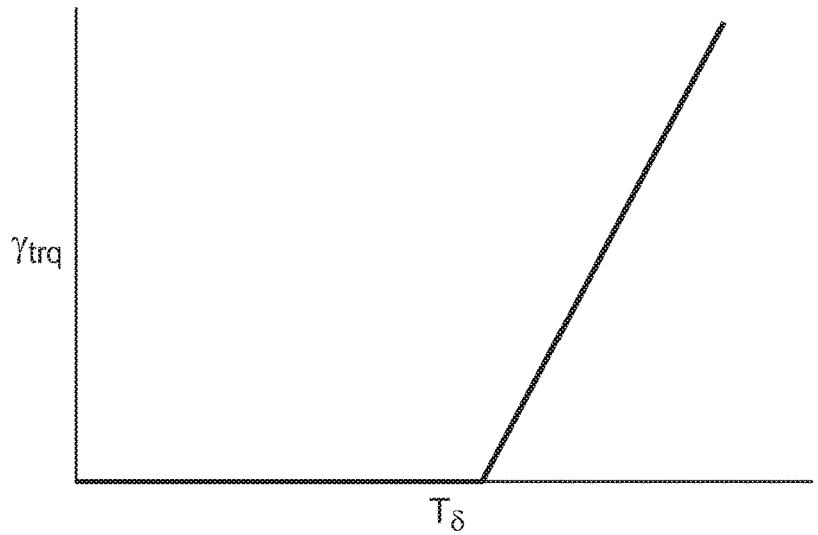
FIG. 12 shows a third example of a map for determining the second target yaw rate.

In the routine shown in FIG. 11, at step S3'', the second target yaw rate $\gamma_{trq}$ is calculated with reference to a different map shown in FIG. 12 that is also installed in the first ECU 50. In this case, as can be seen from FIG. 12, the second target yaw rate $\gamma_{trq}$ is maintained to zero until the steering torque $T_\delta$ detected by the steering torque sensor 45 is increased to a predetermined value, and when the steering torque $T_\delta$ exceeds the predetermined value, the second target yaw rate $\gamma_{trq}$ starts increasing proportionally with an increase in the steering torque $T_\delta$. The predetermined value is set to a value required to increase or maintain the steering angle $\delta$ by the driver in the event of failure of the EPS motor 44, based on a result of an experiment or a simulation.

Since the second target yaw rate $\gamma_{trq}$ thus calculated at step S3'' is maintained to zero until the steering torque $T_\delta$ is increased to the predetermined value, the value calculated at step S9 is substantially identical to the value calculated at step S5.

Figure 13:
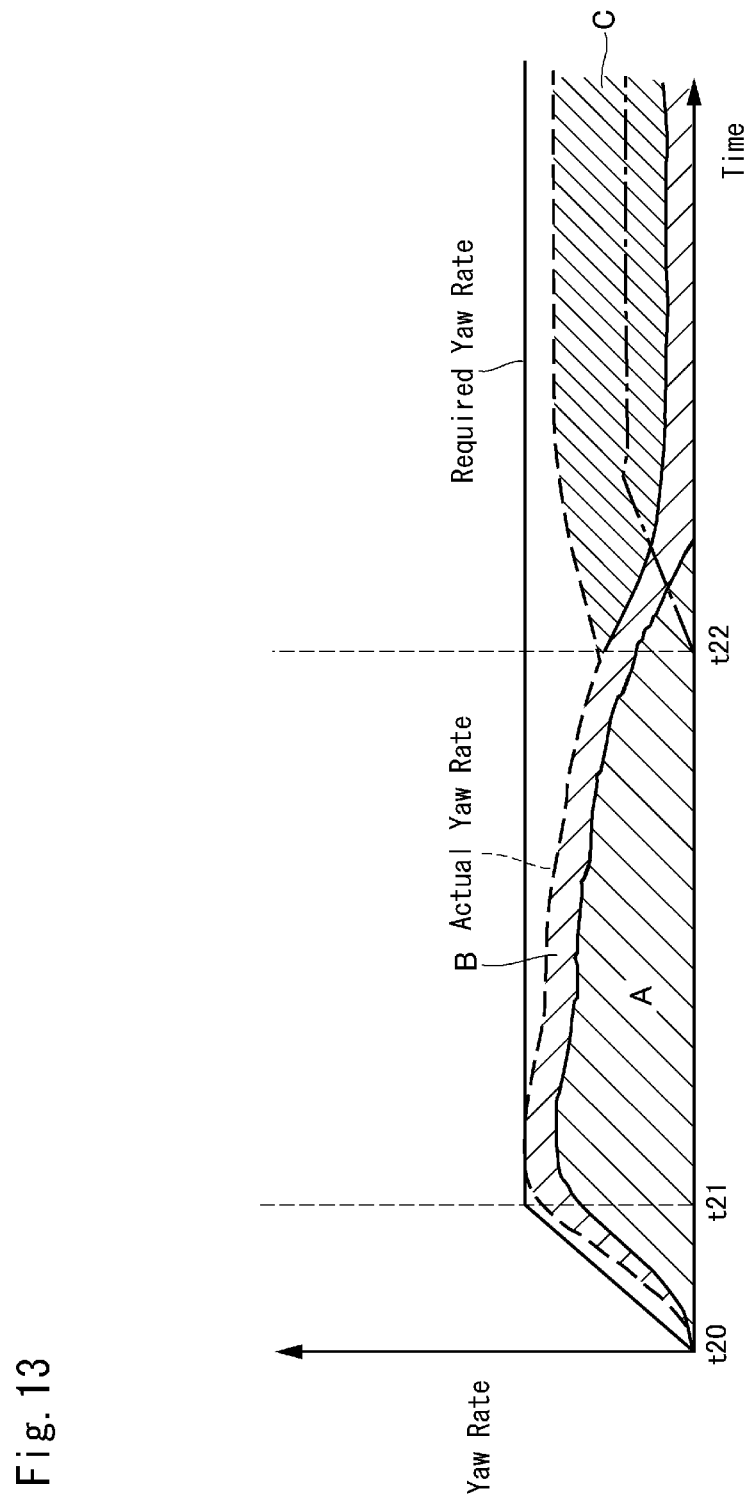
FIG. 13 is a time chart showing a temporal change in the yaw rate during execution of the third control example.

Temporal change in the yaw rate during execution of the routine shown in FIG. 11 is shown in FIG. 13. In the example shown in FIG. 13, same events as those occur during the period from point t0 to t2 in FIG. 7 also occur during a period from point t20 to t22.

When the steering torque $T_\delta$ is increased to the predetermined value so that the second target yaw rate $\gamma_{trq}$ starts increasing at point t22, the first output torque $T^r_{di}$ and the second output torque $T^l_{di}$ calculated at step S5 are corrected based on the second target yaw rate $\gamma_{trq}$. That is, values of the second members in the equations used at step S9 are not zero. In this situation, therefore, the first output torque $T^r_{di}$ and the second output torque $T^l_{di}$ calculated at step S5 are changed in such a manner that the actual yaw rate $\gamma_{real}$ is increased with an increase in the steering torque $T_\delta$. As a result, the actual yaw rate $\gamma_{real}$ is increased from point t22 so that the difference between the required yaw rate and the actual yaw rate $\gamma_{real}$ is reduced.

By thus executing the routine shown in FIG. 11, a desired yaw rate may also be achieved by controlling the a torques of the right pair of wheels and the left pair of wheels based on the second target yaw rate $\gamma_{trq}$, even when the steering wheel 28 cannot be rotated to a desired angle due to reduction in performance of the EPS motor 44.

Although the above exemplary embodiment of the present application have been described, it will be understood by those skilled in the art that the present disclosure should not be limited to the described exemplary embodiments, and various changes and modifications can be made within the spirit and scope of the present application. For example, the drive force control system according to the embodiment may also be applied to an in-wheel motor vehicle in which a motor is individually arranged in each wheel, and to a two-wheel drive vehicle.

In addition, in the steering device 27, the steering shaft 29 may also be rotated hydraulically instead of the motor.

What is claimed is:

1. A drive force control system, comprising:
a motor and gear assembly that applies drive torques to a right wheel and a left wheel so as to rotate the right wheel and the left wheel;
a steering device that turns a pair of steered wheels in accordance with an operating amount of a steering wheel;
an actuator that is disposed on a transmission mechanism between the steering wheel and the steered wheels, and that generates a torque in accordance with a steering torque applied to the steering wheel; and
a controller that controls the drive torques applied to the right wheel and the left wheel,
wherein the controller is configured to:
calculate a first target yaw rate based on a steering angle of the steering wheel;
calculate a second target yaw rate based on the steering torque applied to the steering wheel;
calculate a first target torque of the right wheel and a second target torque of the left wheel based on a first difference between the first target yaw rate and an actual yaw rate;
calculate a third target torque by correcting the first target torque based on the second target yaw rate and the actual yaw rate, and a fourth target torque by correcting the second target torque based on the second target yaw rate and the actual yaw rate; and
transmit signals to the motor to achieve the third target torque and to achieve the fourth target torque.

2. The drive force control system as claimed in claim 1, wherein the controller is further configured to:
- transmit signals to the motor to achieve the third target torque and to achieve the fourth target torque when a second difference between the second target yaw rate and the actual yaw rate is greater than a first predetermined value; and
- transmit signals to the motor to achieve the first target torque and to achieve the second target torque when the second difference is smaller than the first predetermined value.

3. The drive force control system as claimed in claim 2, wherein the controller is further configured to:
- calculate a ratio of the actual yaw rate to the second target yaw rate;
- transmit signals to the motor to achieve the third target torque and to achieve the fourth target torque when the calculated ratio is smaller than a second predetermined value; and
- transmit signals to the motor to achieve the first target torque and to achieve the second target torque when the calculated ratio is greater than the second predetermined value.

4. A drive force control system, comprising:
- a motor and gear assembly that applies drive torques to a right wheel and a left wheel so as to rotate the right wheel and the left wheel;
- a steering device that turns a pair of steered wheels in accordance with an operating amount of a steering wheel;
- an actuator that is disposed on a transmission mechanism between the steering wheel and the steered wheels, and that generates a torque in accordance with a steering torque applied to the steering wheel; and
- a controller that controls the drive torques applied to the right wheel and the left wheel, wherein the controller is configured to:
- calculate a first target yaw rate based on a steering angle of the steering wheel;
- calculate a second target yaw rate based on the steering torque applied to the steering wheel;
- calculate a first target torque of the right wheel and a second target torque of the left wheel based on a first difference between the first target yaw rate and an actual yaw rate;
- calculate a third target torque of the right wheel and a fourth target torque of the left wheel based on a second difference between the second target yaw rate and the actual yaw rate;
- transmit signals to the motor to achieve the third target torque and to achieve the fourth target torque when the second difference is greater than a first predetermined value; and
- transmit signals to the motor to achieve the first target torque and to achieve the second target torque when the second difference is smaller than the first predetermined value.

5. The drive force control system as claimed in claim 4, wherein the controller is further configured to:
- calculate a ratio of the actual yaw rate to the second target yaw rate;
- transmit signals to the motor to achieve the third target torque and to achieve the fourth target torque when the calculated ratio is smaller than a second predetermined value; and
- transmit signals to the motor to achieve the first target torque and to achieve the second target torque when the calculated ratio is greater than the second predetermined value.

* * * * *